April 15, 1969
J. B. THOMPSON
3,438,298
RECORDER
Filed Nov. 21, 1967
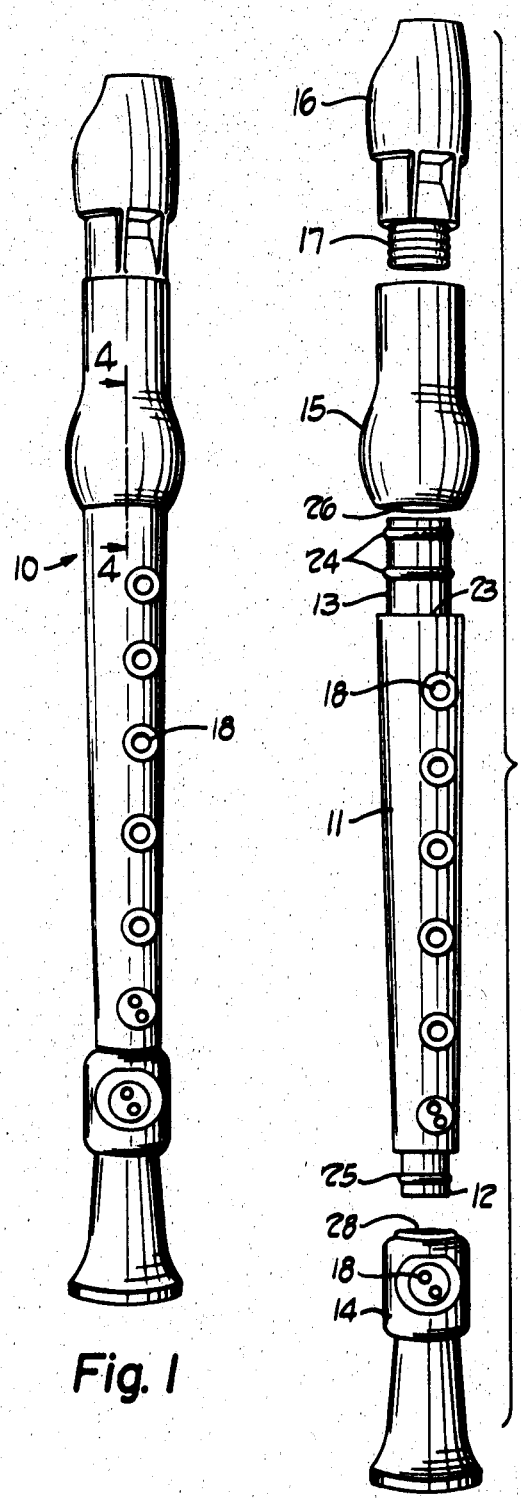
Fig. 1
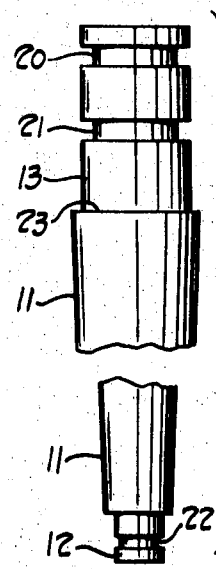
Fig. 2
Fig. 3
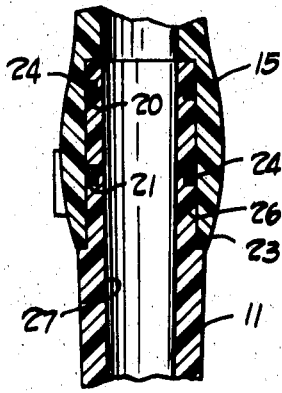
Fig. 4
Fig. 5
Fig. 6
INVENTOR.
JOSEPHUS B. THOMPSON
BY
*Sanford Schurmacher*
ATTORNEY.

United States Patent Office 3,438,298
Patented Apr. 15, 1969

3,438,298
RECORDER
Josephus B. Thompson, Covington, Ohio, assignor to The Grossman Music Corporation, Cleveland, Ohio, a corporation of Ohio
Filed Nov. 21, 1967, Ser. No. 684,862
Int. Cl. G10d 7/02
U.S. Cl. 84—380                                                        2 Claims

ABSTRACT OF THE DISCLOSURE

A recorder having its several sections joined end-to-end in air-tight engagement through preformed resilient plastic O-rings.

This invention relates to musical wind instruments, and particularly to recorders.

The recorder, or "block-flute," is a basic musical instrument. It is actually the forerunner of the original orchestra flute, and dates back to the 13th century.

For some years now, the recorder has been undergoing a renaissance. With the present world-wide rebirth of Baroque music, the recorder is rapidly assuming great popularity in the music world.

In order to provide a better understanding of the invention, it may be well to point out that the recorder is made up of four basic parts, or sections, namely; a body section, a bell section, a barrel section and a mouthpiece section, all joined end-to-end through telescopable joints to provide a wind instrument having a continuous wind passage.

In tuning the instrument, the barrel section must be free to be moved axially of the body section, to change the overall length of the wind passage by small increments.

Heretofore, in order to make the joints air tight it has been the practice to provide the joints with sealing means in the form of cork, thread, or other wrappings which eventually work loose or wear out, permitting air leakage at the joints, which adversely effects the true intonation of the instrument.

The primary object of the invention, therefore, is to provide a recorder having telescopable joints fitted with preformed, unitary, sealing means.

Another object is to provide a recorder whose telescopable male joint elements have a plurality of spaced preformed neoprene O-rings which slidably interfit the smooth-walled bore of their mating female joint elements in the manner of a series of piston rings, to make the assembled instrument completely air tight, while permitting free axial movement of the several mating sections.

These, and other objects of the invention, will become apparent from a reading of the following specification and claims, together with the accompanying drawing, wherein like parts are referred to and indicated by like reference numerals, and wherein:

FIGURE 1 is a top elevational view of the recorder that is the subject of the invention;

FIGURE 2 is an exploded view of the recorder illustrated in FIGURE 1;

FIGURE 3 is a side view of the unmounted body as it appears without the O-ring sealing means;

FIGURE 4 is a sectional view, taken along the line and in the direction of the arrows 4—4 of FIGURE 1;

FIGURE 5 is a perspective view of one of the unmounted O-rings; and

FIGURE 6 is a perspective view of the small O-ring that seats in the joint between the body and bell sections, as seen in FIGURE 2.

Referring more particularly to the drawing, there is seen in FIGURE 1 the recorder, that is the subject of the invention, broadly indicated by reference numeral 10.

While the recorder has traditionally been made of wood, in the preferred form illustrated here, it is molded from a suitable plastic possessing the acoustical properties required for true recorder sound. The use of plastic provides a recorder that is sanitary, moisture-proof, and easily washable.

As seen in FIGURE 2, the recorder 10 is made up of 4 sections in the traditional manner, namely, a body 11, a bell 14, a barrel 15, and a mouthpiece 16; all with axial bores therethrough, which, when the several sections are joined end-to-end, form a continuous, straight, wind passage extending from the bell 14 through to the mouthpiece 16.

Reference numerals 12, 13 and 17 indicate male joint elements formed integral with, and extending axially of both ends of the body section 11, and the wind-passage end of the mouthpiece 16.

As seen most clearly in FIGURE 3, the male joint elements 12 and 13 of the body 11 are right cylindrical in shape with axially spaced circular grooves 20, 21 and 22, cut in the circumferences thereof.

Groove 21 is spaced upwardly from the body shoulder 23, for a reason to be given hereinafter, while groove 20 is positioned proximate the free end of male joint element 13, spaced outwardly of groove 21. Groove 22 is centered on the male joint element 12.

Each groove 20 and 21 has an O-ring seated therein, as seen in FIGURE 2.

The O-rings 24 are molded from a suitable flexible, tough, plastic material, such as "neoprene." The rings 24 have physical measurements such that they may be snugly seated in the grooves 20–21 with their peripheral surfaces projecting approximately 0.010" beyond the face of the male joint element 13, to act as air-sealing piston rings.

A similarly formed, but smaller, O-ring 25 is seated in the groove of the male joint element 12, as again seen in FIGURE 2.

The so mounted, preformed O-rings 24 and 25 may be easily removed and replaced if they become worn, after long use, without requiring any special skill on the part of the musician.

The barrel section 15 has female joint elements at both ends thereof in the form of open-ended, smooth-walled bore sockets 26, as seen in FIGURE 4. The bell section 14 also has a female joint element, or socket 28, as seen in FIGURE 2.

The several sections are joined together by telescopically inserting the male joint element into the female joint element, as seen in FIGURE 4, to provide the assembled instrument seen in FIGURE 1, with a continuous air bore 27 extending therethrough, as seen, again, in FIGURE 4.

The outer diameter of the male joint elements is such that when fitted into the female joint elements the O-rings 24 and 25, of the male elements, interfit the female element bores in the manner of piston rings, to provide airtight fits between the mating elements.

The male joint element 13 of the body section 11, which mates with the barrel section female joint socket 26, is of a length to allow the barrel section 15 to be moved axially thereof, toward and away from the shoulder 23, to provide the necessary adjustments required for tuning the recorder.

In order to provide an air-tight seal in all possible positions, the O-ring groove 21, as is seen most clearly in FIGURE 3, is spaced upwardly of the shoulder 23 of the body 11, approximately ⅜".

The body and bell sections of the so-assembled recorder have the usual tone-holes 18 which are selectively covered by the fingers in playing the instrument.

It will now be clear that there is provided a device which accomplishes the objectives heretofore set forth.

I claim:
1. A recorder of the type described, comprising:
   (a) a tubular body section, provided with a plurality of tone holes disposed generally of the upper side thereof;
   (b) a hollow barrel, tuning section;
   (c) a mouthpiece section;
   (d) a bell section;
   the barrel and bell sections being joined to opposite ends of the body section through female joint elements which telescopically interfit male joint elements formed integral with the body section through shoulders at the base ends thereof; the body male element that interfits the female element of the barrel having two axially spaced circumferential grooves; the body male element that interfits the female element of the bell section having a single circumferential groove; and
   (e) a resilient plastic O-ring, of larger outside diameter than that of the male element, seated in each of the several grooves, with its peripheral edge bearing against the female joint element in air-tight engagement, to provide a musical instrument of the type described, having a continuous, straight, wind passage whose overall length can be varied in small increments, for tuning, by sliding the barrel longitudinally of its telescopically engaged body male joint element.

2. A recorder, as in claim 1, wherein the first circumferential groove of the body male joint element, that interfits the female joint element of the barrel, is positioned proximate the free end of said male element, with the second circumferential groove spaced both outwardly of the body shoulder and inwardly of the first circumferential groove.

References Cited

UNITED STATES PATENTS 968,694   8/1910   Rubright _____ 84—380

RICHARD B. WILKINSON, *Primary Examiner.*

G. M. POLUMBUS, *Assistant Examiner.*

U.S. Cl. X.R.

84—384